United States Patent [19]

Schlademan

[11] Patent Number: 4,656,213
[45] Date of Patent: Apr. 7, 1987

[54] ACRYLIC HOT MELT PRESSURE SENSITIVE ADHESIVE COMPOUNDS

[75] Inventor: James A. Schlademan, Stow, Ohio

[73] Assignee: Atlantic Richfield Company, Los Angeles, Calif.

[21] Appl. No.: 665,235

[22] Filed: Oct. 26, 1984

[51] Int. Cl.$^4$ .............................................. C08L 51/06
[52] U.S. Cl. .................... 524/272; 524/314; 524/533; 525/64
[58] Field of Search ............... 525/308, 309, 301, 303, 525/64; 427/208.4; 524/272

[56] References Cited

U.S. PATENT DOCUMENTS

| 3,786,116 | 1/1974 | Milkovich et al. | 525/309 |
| 4,225,476 | 9/1980 | Hammer et al. | 525/207 |
| 4,551,388 | 11/1985 | Schlademan | 525/309 |
| 4,554,324 | 11/1985 | Husman et al. | 525/301 |

FOREIGN PATENT DOCUMENTS

| 483243 | 5/1952 | Canada | 524/272 |
| 104046 | 3/1984 | European Pat. Off. | |
| 123533 | 10/1944 | United Kingdom | |
| 2056999 | 3/1981 | United Kingdom | |

OTHER PUBLICATIONS

"Escorez ®5000 Resins . . ."—Exxon Chemical Co., pp. 1–10.

Primary Examiner—Carman J. Seccuro
Attorney, Agent, or Firm—Lewis J. Young

[57] ABSTRACT

Acrylic pressure sensitive hot melt adhesives having improved creep resistance at ambient temperatures and desirable melt viscosity at elevated application temperatures are prepared by copolymerizing suitable acrylic and methacrylic acids and alkyl esters with 10–40 percent by weight of an acrylate or methacrylate terminated vinyl aromatic monomer based macromolecular monomer.

Compounding these adhesives with suitable tackifiers and plasticizers produces adhesives having low molten viscosity and significantly better shear adhesion, tack, and peel adhesion than is possible with the uncompounded acrylic adhesives.

6 Claims, No Drawings

ACRYLIC HOT MELT PRESSURE SENSITIVE ADHESIVE COMPOUNDS

BACKGROUND OF THE INVENTION

Acrylic hot melt pressure sensitive adhesives and compounds of these are useful in the production of tapes, labels, and decals having superior weathering and solvent resistance to similar adhesives prepared from conventional styrene/diene block copolymers. The ability of these adhesives to be applied from the melt and their excellent creep resistance gives them significant performance and processing advantages over conventional solvent and emulsion based acrylic pressure sensitive adhesives.

Previous attempts to product hot melt acrylic pressure sensitive adhesives have involved the blending of high and low molecular weight acrylic polymers having carefully selected compatibility characteristics. These efforts have failed to produce an adhesive with the desired balance of adhesive and cohesive properties coupled with molten viscosities suitable for practical hot melt applications. Davis et al, in U.S. Pat. No. 3,925,282, discloses a system which incorporates a tertiary amine containing monomer in the tacky acrylic polymer followed by reaction of this polymer with a heavy metal containing compound. The use of heavy metals is undesirable, however, from the standpoint of product toxicity and no molten viscosities are given for their examples.

The preparation of macromolecular monomers and their copolymerization with acrylates is described in U.S. Pat. No. 3,786,116, by Milkovich et al. However, the patent does not teach the use of this technique for the preparation of the novel adhesive compositions described in the present invention.

Human et al, in European Patent Application Ser. No. 104,046, use the Milkovich copolymers in pressure sensitive adhesive compositions, but the viscosities of the compositions are too high for many hot melt applications.

Sliwka et al, in U.S. Pat. No. 3,558,746 utilized graft copolymers of styrene and and acrylates to obtain lower viscosity hot melt adhesives. The lower viscosity was obtained by graft structures and by keeping the molecular weights of the copolymers low by chain transfer and the use of higher initiator concentrations.

SUMMARY OF THE INVENTION

I have now discovered that when these acrylic hot melt pressure sensitive adhesives are prepared at high molecular weight and compounded with suitable tackifiers and plasticizers, an adhesive composition can be produced having low molten viscosity and significantly better shear adhesion than is possible in the uncompounded polymer system. These adhesive compounds also exhibit improved tack and peel adhesion values over the uncompounded acrylic adhesives. The adhesive compounds have molten viscosities in the range of 20,000 cps, or less, with facilitate hot melt coating.

DESCRIPTION OF THE INVENTION

The invention comprises pressure-sensitive hot melt adhesive compositions consisting essentially of (a) 40 to 80% by weight of a thermoplastic graft copolymer of (i) 10–40% by weight, based on graft copolymer, of a macromolecular monomer consisting of poly(vinyl aromatic monomer) of number average molecular weight between 5000 and 50,000 terminated with an alkylene oxide, such as ethylene oxide and subsequent reaction with acryloyl or methacryloyl chloride to form terminal acrylate or methacrylate groups, and (ii) 60–90 percent by weight, based on graft copolymer, of one or more monomers selected from the group consisting of acrylic acid, acrylamide, methacrylic acid, methacrylamide, and alkyl acrylates having 1–10 carbon atoms in the alkyl groups; whereby the terminal acrylate or methacrylate groups of said macromolecular monomer (i) are addition copolymerized with the monomer of monomer (ii) to produce a graft copolymer having pendant poly(vinyl aromatic monomer) groups; (b) 10 to 45% by weight of a tackifier resin incompatible with the poly(vinyl aromatic monomer) block of the graft copolymer and compatible with the acrylate block of the graft copolymer; and (c) 0 to 15% by weight of a plasticizing oil.

The thermoplastic graft copolymers useful for the present invention are preferably those prepared by the process taught in U.S. Pat. No. 3,786,116, issued to CPC International, wherein a macromolecular monomer is first prepared, and then the macromolecular monomer is copolymerized with one or more monomers selected from the group consisting of acrylic acid, acrylamide, methacrylic acid, methacrylamide, and alkyl acrylates where the alkyl groups may contain from 1 to 10 carbon atoms.

The macromolecular monomer may be prepared from any monomer polymerizable by anionic initiators to form a polymer whose Tg is between 30° and 150° C. and whose polymer is incompatible with polyacrylates.

The preferred monomer is one of the vinyl aromatic monomers such as styrene, alpha-methylstyrene, nuclear-methylstyrene, indene, and p-tert-butylstyrene.

The macromolecular monomers of special interest are made by polymerizing styrene with an alkyl lithium initiator to a polystyrene of number average molecular weight between 5,000 and 50,000, preferably between 9,000 and 35,000, and then capping the polystyryl chains with first an alkylene oxide and then an acrylate or methacrylate group. It is the acrylate or methacrylate group which copolymerizes with the alkyl acrylates.

The alkyl acrylates useful in the invention are those whose alkyl groups contain from 1 to 10 carbon atoms. These include methyl acrylate, ethyl acrylate, propyl acrylate, isopropyl acrylate, the four butyl acrylates, the amyl acrylates, the hexyl acrylates, the 2-ethylhexyl and other octyl acrylates, the nonyl acrylates, and the decyl acrylates.

The thermoplastic graft copolymers are prepared by copolymerization of the macromolecular monomer with one or more monomers selected from the group consisting of acrylic acid, acrylamide, methacrylic acid, methacrylamide, and the alkyl acrylates by conventional free-radical initiated copolymerization techniques. The preferred copolymers are prepared by copolymerizing 10 to 40 percent by weight, based on graft copolymer, of the macromolecular monomer with 60 to 90 percent by weight, based on graft copolymer, of the one or more monomers, as taught in U.S. Pat. No. 3,786,116. The resultant copolymer consists of an acrylate backbone with polystyrene chains grafted to the backbone. The copolymerization proceeds according to known relationships based on the relative reactivities of the monomers as derived from standard copolymerization texts. The temperature of copolymerization may vary from 20° C. to about 150° C. for periods of time from 2-24 hours or until conversion reaches about 95% or greater. Preferred molecular weights of the graft copolymers are between 100,000 and 400,000 as measured by Gel Permeation Chromatography using a Waters GPC150 fitted with two Shodex A-80 polystyrene columns calibrated with polystyrene standards.

The tackifier resins are resins which are incompatible with the poly(vinyl aromatic monomer) blocks of the graft copolymer and are compatible with the acrylate blocks of the graft copolymer. Preferably, these are the rosin derivatives such as hydroabietyl alcohol, the esters of rosin and hydrogenated rosin formed with pentaerythritol, glycerine, and ethylene glycol and alkyd type resins. They are useful in amounts of from 10 to 45% by weight, based on total adhesive compound.

The plasticizers may be any of the known ester, phosphate, paraffin or hydrocarbon type plasticizers, including low melting polyisobutenes, high viscosity motor oils, etc. Up to 15%, based on total adhesive compound, of plasticizer may be used. Especially useful are the ester types such as dioctyl adipate, diisobutyl adipate, trioctyl trimellitate and dibutoxyethoxyethyl adipate.

Use of tackifiers and plasticizers of the invention with the high molecular weight graft copolymers allow molten viscosities of from 1,000 to 100,000 cps at 180° C. to be attained. The preferred range is from 10,000 to 30,000 cps for optimum hot melt applications.

The following examples are given to further illustrate the invention, but are not intended to be all inclusive. All percentages are weight percent unless otherwise indicated.

EXAMPLE I a. Preparation of Polystyrene Terminated with Methacryloyl Chloride

A glass and stainless steel reactor was charged with 1100 grams of cyclohexane, pre-dried over molecular sieves, and 400 grams of styrene purified over activated alumina. The reactor temperature was raised to 70° and s-butyllithium solution (1.4M in cyclohexane) was slowly added until a persistant light reddish-orange color was obtained. An additional 100 ml (0.140 moles) of s-butyllithium was immediately added. Styrene was then pumped into the reactor for 30 minutes until a total of 1820 grams had been added. The temperature was maintained at 70° C. for 30 minutes and then 12.3 grams of ethylene oxide (0.28 moles) was added causing the solution to become colorless. To the resulting solution was added 16.1 grams (0.154 moles) of methacryloyl chloride to give a macromolecular monomer of 13,000 molecular weight, measured by GPC, having the following structural formula:

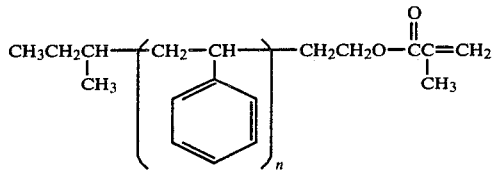

where n has a value such that the molecular weight is 13,000.

b. Preparation of Macromolecular Monomer/Acrylate Copolymer

A resin kettle fitted with a condenser, thermometer, dropping funnel and stirrer was charged with 200 grams of ethyl acetate and heated to 65° C. A mixture of 283.0 grams of n-butyl acrylate, 83.3 grams of the macromolecular monomer solution from Example 1a (50.0 grams dry weight), and 1.00 grams of azobisisobutyronitrile initiator was then added to the ethyl acetate over 30 minutes and the resulting solution held at 65° C. for 2 hours. Upon completion, the polymer solution had a total solids content of 57.5% (theoretical: 58.8%). Removal of the solvent under vacuum gave a clear tacky polymer having an apparent GPC peak molecular weight (polystyrene standard) of 304,500 and having 15% by weight macromolecular monomer and 85% by weight n-butyl acrylate.

c. Compounding Macromolecular Monomer/Acrylate Copolymer with Tackifier and Plasticizer The copolymer prepared in (b) above was compounded with Super Ester A-100 tackifier (a hydrogenated rosin ester sold by Arakawa Chemical Company) and either Abitol plasticizer (a hydroabietyl alcohol sold by Hercules, Inc.) or TOTM plasticizer (trioctyltrimellitate sold by C. P. Hall Company). Results shown in Table I.

d. Adhesive Testing

The polymers obtained were tested by adding tackifier and plasticizer to an aliquot of the polymer syrup as indicated. Sufficient toluene was added, if needed, to give a final solids content of 40% maximum and the resulting mixture rolled to achieve solution. Adhesive solutions were then coated onto 2 mil Mylar ® film to give an adhesive dry coating thickness of 1.0 to 1.5 mil, cut into strips and tested according to Pressure Sensitive Tape Council and ASTM Methods as follows:

Tack was determined using a Polyken Probe Tack Tester according to ASTM D2979 using a probe speed of 1 cm/sec and a dwell time of 1 second.

Peel adhesion was measured according to PSTC No. 1 for 180° C. peel. The substrate was stainless steel.

Shear adhesion was measured using a stainless steel substrate according to PSTC No. 7 utilizing a ½"×½" contact area and 1 Kg load.

TABLE I

|  | 1 | 2 | 3 | 4 |
|---|---|---|---|---|
| Formulation (phr) |  |  |  |  |
| Copolymer | 100 | 100 | 100 | 100 |
| Super Ester A100 | 80 | 80 | 80 | — |
| Abitol | — | 20 | — | — |
| TOTM | — | — | 20 | — |
| Adhesive Properties |  |  |  |  |
| Tack, g, 1 sec. dwell | 741 | 1260 | 2115 | — |
| Peel, oz/in | 118.4 | 114.8 | 106.4 | — |
| Shear, min | 161 | 26 | 4.4 | — |
| Viscosity, cps a 180° C. | 43,100 | 21,400 | 16,760 | >100,000 |

EXAMPLE II

Using the method of Example I(b), a series of copolymers were prepared from 15% by weight of the macromolecular monomer and 85% by weight of a comonomer chosen from n-butyl acrylate (NBA), 2-ethylhexyl acrylate (EHA) a 50—50 mixture of the two, isodecyl acrylate (IDA) and mixtures of these acrylates with small amounts of acrylic acid (AA). These copolymers were then compounded with Super Ester A-100 and TOTM in the parts per hundred parts of copolymer (phr) indicated in Table II. The adhesive properties of the compounded adhesives are shown in Table II.

It will be seen that at graft copolymer molecular weight 463,000, the molten viscosity is greater than 100,000 cps even though more tackifier was added than in any of the other compounds.

TABLE III

| Comonomer | Copolymer MW × 10⁻³ | S.P. | Viscosity cps @ 180° C. |
|---|---|---|---|
| EHA | 160.7 | 75 | 2190 |
|  | 160.7 | 100 | 2970 |
|  | 160.7 | 115 | 3680 |
| IDA | 181.6 | 75 | 2980 |
| AA (0.025) | 181.6 | 100 | 3560 |
|  | 181.6 | 115 | 11260 |

EXAMPLE IV

Using identical recipes, two polymers were prepared from 15% by weight of macromolecular monomer from Example I(a), 83% by weight of 2-Ethylhexyl Acrylate, and 2% by weight of Acrylic acid. The polymers were compounded with 80 phr of Super Ester A-75 tackifier (an ethylene glycol ester of hydrogenated resin sold by Arakawa Chemical Company) and 20 phr of TOTM plsticizer (trioctyl mellitate sold by C. P. Hall Company), and the adhesive isolated. The adhesives were coated onto Mylar ® film using a laboratory hot melt coater. The results were as follows:

| Polymerization Method | 10 oz. Bottle | 2 Gallon Reactor |
|---|---|---|
| Tack, g. | 1240 | 750 |
| Peel, oz/in | 26.6 | 36.2 |
| Shear, min. | 53 | 87 |
| Viscosity, cps a 180° C. | 8,200 | 3,210 |
| Coated Performance | Excellent | Excellent |

TABLE II

| Comonomer | Copolymer M.W. × 10⁻³ | Super Ester A-100, phr | TOTM phr | Tack, g. | Shear, min | Peel, oz/in | Viscosity cps @ 180° C. |
|---|---|---|---|---|---|---|---|
| EHA | 160.7 | 45.6 | 7.4 | — | 32 | 94.3 | 1.450 |
| IDA AA (.025) | 181.6 | 45.6 | 7.4 | — | 430 | 106.2 | 1.790 |
| IDA AA (0.025) | 181.6 | 45.6 | 0 | — | 5475 | 29.5 | 3,560 |
| NBA | 185.0 | 80 | 15 | 2291 | 5 | 103.7 | 3,800 |
| NBA AA (0.05) | 208.1 | 45.6 | 7.4 | — | 178 | 64.9 | 11,400 |
| EHA NBA AA (0.25) | 218.5 | 45.6 | 7.4 | — | 46 | 122.5 | 8,050 |
| EHA | 230.5 | 80 | 15 | 1681 | 99 | 82.0 | 8,990 |
| EHA | 250.6 | 80 | 15 | 1645 | 124 | 79.7 | 11,620 |
| EHA NBA | 269.3 | 80 | 15 | 2453 | 36 | 106.5 | 34,550 |
| NBA | 290.2 | 80 | 15 | 2461 | 20 | 110.5 | 68,900 |
| NBA | 318.6 | 80 | 15 | 2196 | 26 | 111.0 | 88,000 |
| NBA | 371.2 | 45.6 | 7.4 | — | 35 | 120.2 | 69,700 |
| NBA | 463.0 | 97.0 | 15.7 | 2207 | 64 | 131.7 | 112,200 |

EXAMPLE III

To illustrate that the molten viscosity of the compounded adhesives can be altered by the use of tackifier resins having different softening points, some of the copolymers of Example II were compounded with 45.6 phr of three tackifiers sold by Arakawa Chemical Company: Super Ester A-75 (an ethyleneglycol ester of hydrogenated rosin) s.p. 75° C.; Super Ester A-100 (glycerine ester of hydrogenated rosein) s.p. 100° C.; and Super Ester A-115 (a pentaerythritol ester of hydrogenated resin) s.p. 115. Results of the adhesive testing are shown in Table III.

Although some differences in adhesion values were obtained by the two polymerization methods, both samples were shown to be suitable for hot melt pressure sensitive applications.

I claim:

1. A pressure-sensitive hot melt adhesive composition consisting essentially of:
   (a) 40 to 80% by weight of a thermoplastic graft copolymer of (i) 10 to 40% by weight, based on a graft copolymer, of a macromolecular monomer consisting of poly(vinyl aromatic monomer) made by polymerization of vinyl aromatic monomer with an alkyllithium initiator to a poly(vinyl aromatic monomer) of number average molecular weight between 5000 and 50,000 capped with an alkylene oxide and subsequently reacted with acryloyl or methacryloyl chloride to form terminal acrylate or methacrylate groups, and (ii) 60 to 90% by weight, based on graft copolymer, of one more monomers selected from the group consisting of acrylic acid, acrylamide, methacrylic acid, methacrylamide, and alkyl acrylates having 1 to 10 carbon atoms in the alkyl groups;

(b) 10 to 45% by weight of a tackifier resin incompatible with the poly(vinyl aromatic monomer) blocks of the graft copolymer and compatible with the acrulate blocks of the graft copolymer; and (c) 0 to 15% by weight of a plasticizing oil.

2. The pressure sensitive hot melt adhesive composition of claim 1 wherein said macromolecular monomer is a methacrylated polystyrene of number average molecular weight of 12000 to 13000.

3. The pressure sensitive hot melt adhesive composition of claim 1 wherein said adhesive composition has a molten viscosity of from 1,000 to 100,000 centipoise at 180° C.

4. The pressure sensitive hot melt adhesive composition of claim 1 wherein said thermoplastic graft copolymer has a molecular weight of from 100,000 to 500,000 as measured by Gel Permeation Chromatography calibrated using polystyrene standards.

5. The pressure sensitive hot melt adhesive composition of claim 1 wherein said tackifier resin is a hydrogenated rosin ester.

6. The pressure sensitive hot melt adhesive composition of claim 1 wherein said plasticizing oil is an ester of adipic or trimellitic acid.

* * * * *